United States Patent [19]

Erwin

[11] Patent Number: 5,617,843
[45] Date of Patent: Apr. 8, 1997

[54] SOLAR OVEN WITH ORIENTING APPARATUS

[76] Inventor: Samuel F. Erwin, 220 Southridge Way, Grants Pass, Oreg. 97527

[21] Appl. No.: 678,983

[22] Filed: Jul. 12, 1996

[51] Int. Cl.$^6$ .................................................. F24J 2/02
[52] U.S. Cl. ............................... 126/681; 126/608
[58] Field of Search ............................. 126/681, 680, 126/600, 608, 593

[56]  References Cited

U.S. PATENT DOCUMENTS

| | | | |
|---|---|---|---|
| 3,896,786 | 7/1975 | Clevett | 126/681 |
| 4,125,109 | 11/1978 | Erwin | 126/681 |
| 4,378,790 | 4/1983 | Erwin | 126/681 |
| 4,696,285 | 9/1987 | Zwach | 126/681 |
| 4,979,494 | 12/1990 | Anderson | 126/681 |

FOREIGN PATENT DOCUMENTS 3520694  1/1986  Germany ........................... 126/608

*Primary Examiner*—James C. Yeung
*Attorney, Agent, or Firm*—Charles E. Cates; Richard G. Harrer

[57]  ABSTRACT

An apparatus for supporting and adjusting a solar oven with respect to the sun, the apparatus having a horizontally disposed main frame and a pair of vertical, spaced apart supports mounted to the main frame, the solar oven being pivotally mounted to the vertical supports; with means to lock the solar oven in a variety of positions with respect to the sun.

9 Claims, 3 Drawing Sheets

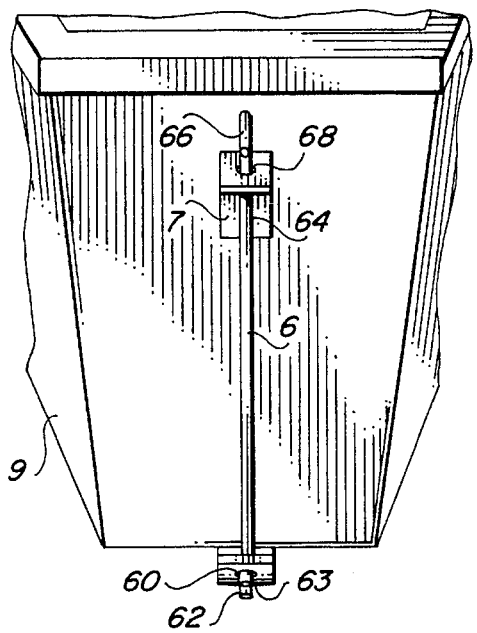
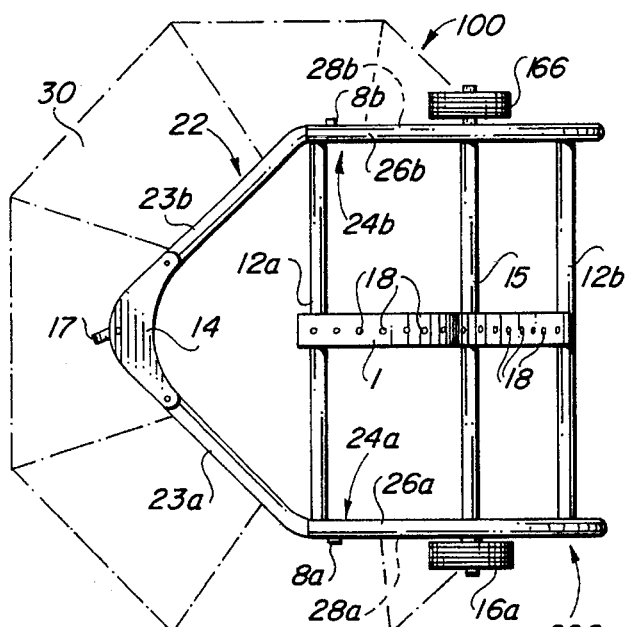
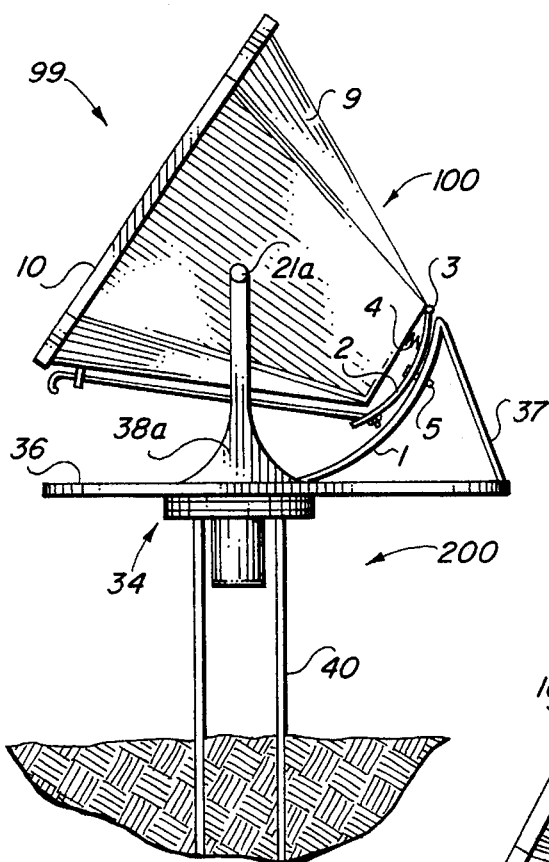
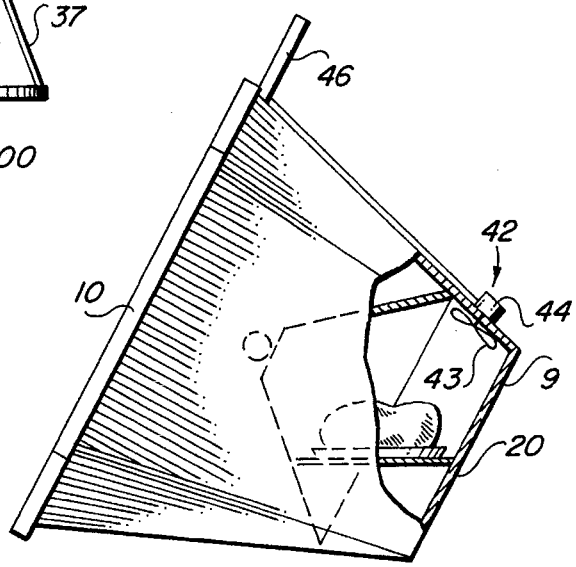

SOLAR OVEN WITH ORIENTING APPARATUS

This application claims the benefit under Title 35, United States Code 119(e) of U.S. provisional application Ser. No. 60/001,198 filed Jul. 14, 1995.

My invention relates to solar ovens. More particularly, it relates to an improved solar oven including an apparatus for adjusting the orientation of the oven with respect to the sun.

High efficiency solar ovens capable of reaching temperatures comparable to the conventional oven often require the use of curved or multi-segment reflectors to concentrate the sun's energy, and can be relatively large. Such solar ovens must be properly oriented with respect to the sun to maximize the benefits of available solar energy. However, existing apparatus for orienting solar ovens are either cumbersome to use with large solar ovens or they are relatively expensive and complex to manufacture and use.

Accordingly, the present invention is directed to a solar oven having an apparatus for adjusting the orientation of the oven with respect to the sun, which apparatus is simple, convenient and cost-effective to manufacture and use. While the orientation adjustment apparatus is suitable for use with solar ovens of any size, it is particularly useful for orienting a large solar oven.

BRIEF DESCRIPTION OF THE DRAWINGS

The features, objects and advantages of the invention will be more fully understood from the following detailed description and accompanying drawings, in which:

FIG. 3A is a partial front side view showing detail of a pull rod mounted to the oven shell.

FIG. 4 is a schematic top plan view of the support means of FIG. 1.

FIG. 5 is a side view of an alternative embodiment of a solar cooking apparatus made in accordance with my invention.

FIG. 6 is a partial sectional side view of an alternate embodiment of a solar oven utilizing a fan and solar cell for convection cooking.

DESCRIPTION

Figure 1:
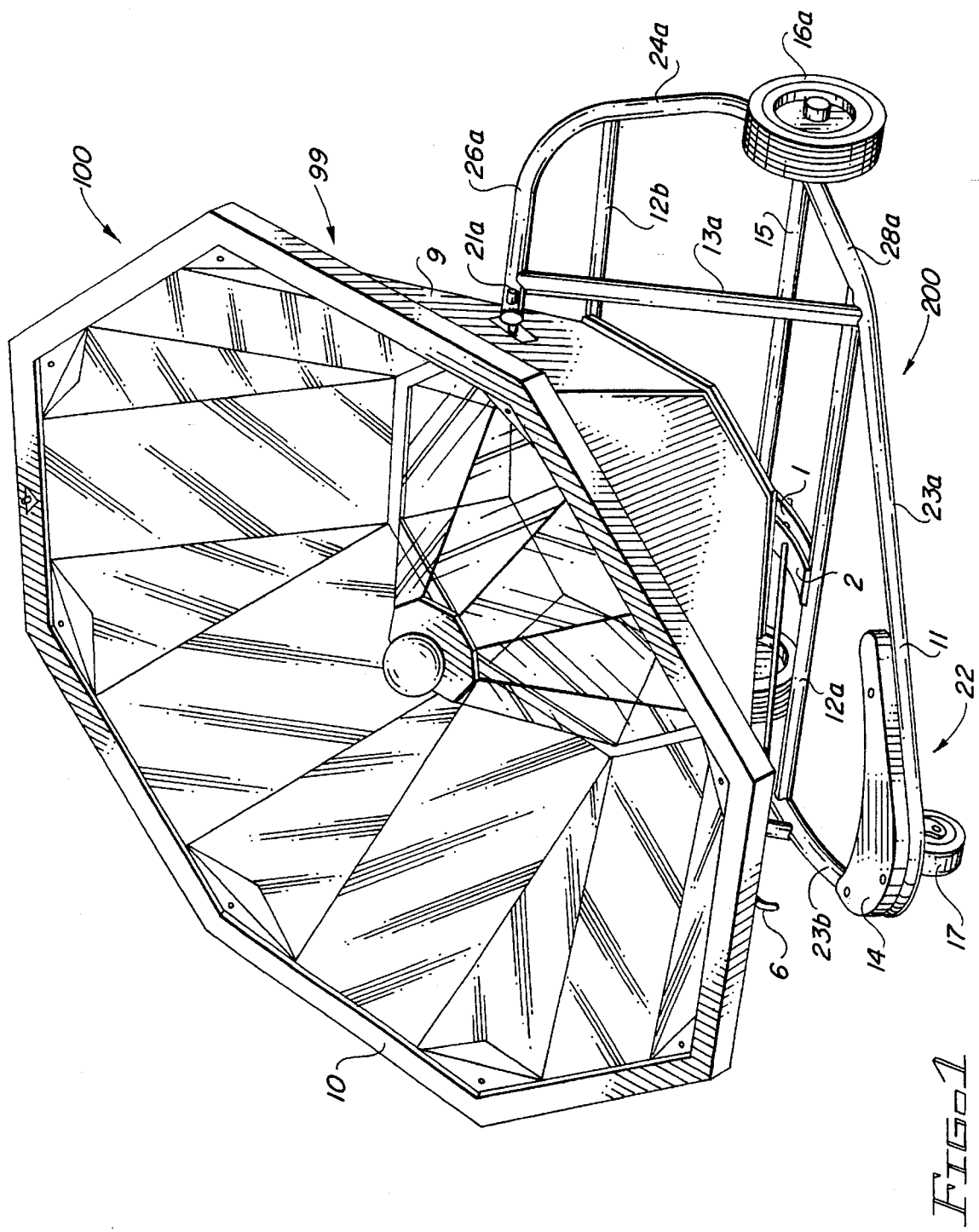
FIG. 1 is a perspective view of one embodiment of my invention showing a solar oven assembly and support means for supporting that assembly.

In accordance with my invention, FIG. 1 shows a solar oven 99 having an oven assembly 100 for converting solar energy incident thereon to heat for heating an article, typically food, contained therein, and a support means 200 for supporting the oven assembly 100. The oven assembly 100 is of the type disclosed in my U.S. Pat. No. 4,125,109 issued Nov. 14, 1978. It includes an oven shell 9 having an octagonal shape in plan view and a relatively flat bottom 20 also having an octagonal shape. The oven shell 9 is truncated with eight sides being inclined outwardly at an open top 18. An oven rim 10 is secured to the shell top 18. Shell pivot bolts 21a, 21b are mounted to the oven shell 9 at diametrically opposed points on the oven shell 9 extend outwardly from the outer surface of the oven shell 9 along the same axial alignment. The pivot bolts 21a, 21b are mounted a suitable distance between the oven rim 10 and the oven bottom 20 so that the total weight of the oven assembly 100 and the food therein is balanced to require minimal effort to change the vertical orientation of the oven shell 9 as described below. In a preferred embodiment, this distance is approximately midway between the oven rim 10 and the oven bottom 20.

Figure 2:
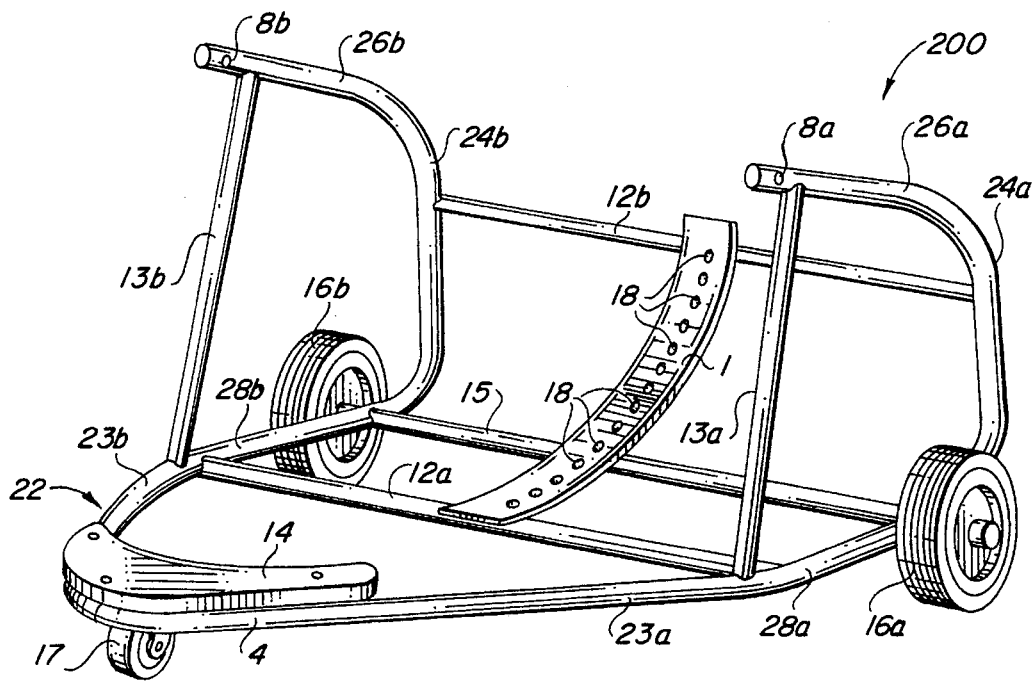
FIG. 2 is a perspective view of the support means of FIG. 1.
Figure 3:
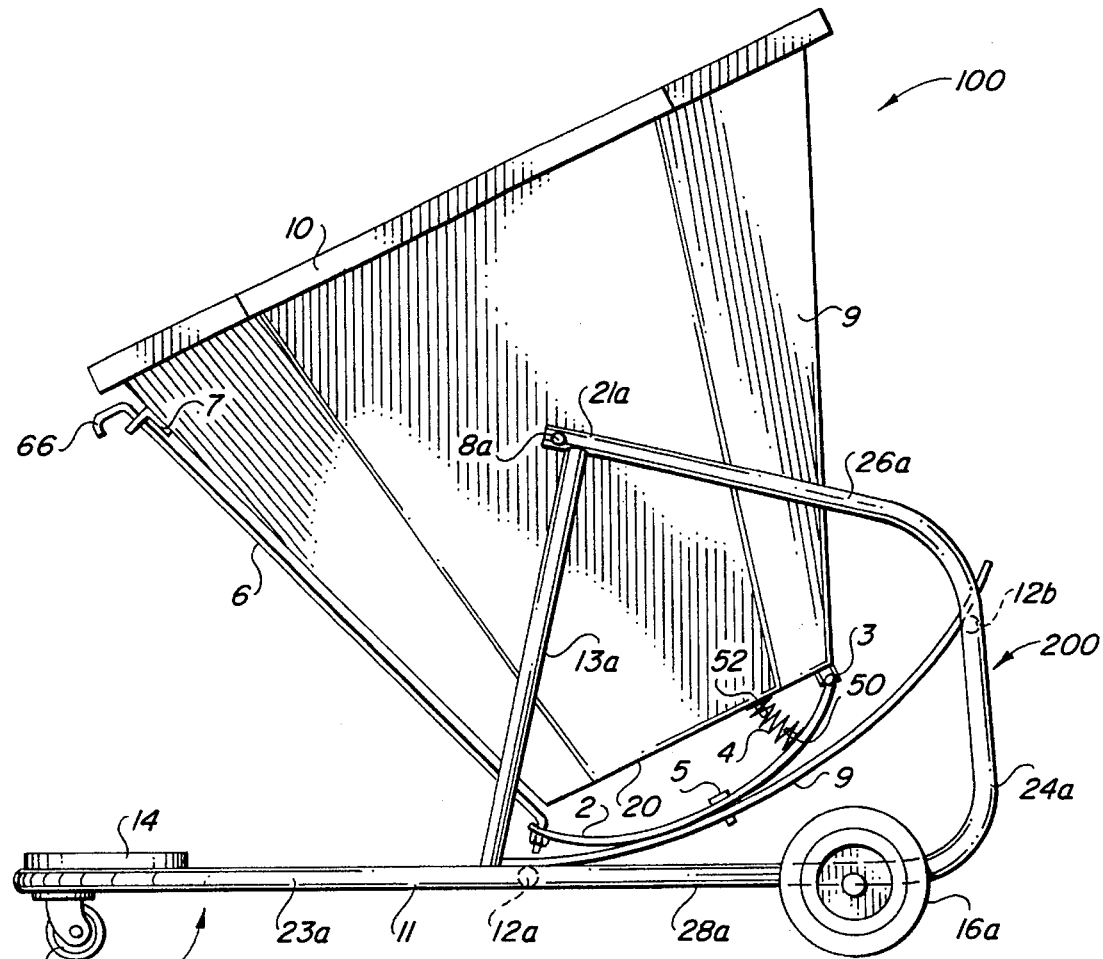
FIG. 3 is a side view of the embodiment of FIG. 1.

Referring to FIGS. 1–3, the support means 200 comprises a main support frame member 11 having a generally horizontally disposed, generally V-shaped section 22. Each leg 23a, 23b of the V-shaped section 22 terminates in a generally vertically disposed, generally U-shaped section 24a, 24b having an upper arm 26a, 26b and a lower arm 28a, 28b with the open end of each U-shaped section 24a, 24boriented toward the V-shaped section 22. Each U-shaped section lower arm 28a, 28b is integrally attached to the corresponding leg 23a, 23b of the V-shaped section 22. The U-shaped sections 24a, 24b are spaced apart from each other a sufficient distance to allow the oven shell 9 to be disposed between them. A vertical support member 13a, 13bis secured between each leg 23a, 23b of the V-shaped section 22 and the upper arm 26a, 26b of the corresponding U-shaped section 24a, 24b by any suitable fastening means, e.g., a bolt or a weld. A lower horizontal cross tie member 12a is secured between the legs of the V-shaped section 22 by similar suitable fastening means. An upper horizontal cross tie member 12b is secured between the U-shaped sections 24a, 24b at a point on the closed end of each U-shaped section near the upper arm 26a, 26b. The main support frame member 11, the vertical support members 13a, 13b, and the horizontal cross tie members 12a, 12b are made of a rigid material, preferably tubular steel or aluminum. An axle support member 15 is secured between the lower arms 28a, 28bof the U-shaped sections 24a, 24b. A wheel 16a, 16b is rotatably mounted to each end of the axle support member 15 by means of an axle in said support which may be the member 15 or an axle extending through member 15 which may be a hollow tube. A caster support shoe 14 is secured to the main support frame member 11 near the point of the V-shaped member 22 by suitable fastening means such as bolts. A caster 17 is rotatably mounted to the caster support shoe 14. In this configuration, the support means 100 can be freely rotated and moved in any direction on a generally flat, horizontal surface.

Pivot holes 8a, 8b are located in each of the upper arms 26a, 26b of U-shaped sections 24a, 24b and are positioned and sized to freely receive the shell pivot bolts 21a, 21b. The shell pivot bolts 21a, 21b are inserted through the pivot holes 8a, 8b so that the shell frame is rotatably mounted to the main support frame 11. The shell pivot bolts 21a, 21b freely support the oven shell 9 for angular movement. In this configuration, the angular position of the oven shell 9 can be freely adjusted by rotating the oven shell 9 about the axis formed by the shell pivot bolts 21a, 21b.

Referring to FIGS. 2 and 3, a generally rigid arcuate locking strap 1 is secured between cross tie rods 12a and 12b approximately midway along their length, with the convex side of the locking strap positioned downwardly. The locking strap 1 is curved on an arc of a circle having a radius approximately equal to the distance from the pivot hole 8a to the cross tie rod 12 and its center. The locking strap 1 has holes 18 spaced along its length and sized to receive a locking pin 5.

A pivot pin or hinge 3 attaches one end of a generally rigid arcuate locking bar 2 to the oven bottom 20 near an edge of the oven bottom 20. The arcuate locking bar 2 is curved on an arc of a circle having a radius that is less than that of the arcuate locking strap 1. Preferably, the locking bar 2 is made of a metal strap bent to a radius smaller than the radius of the locking strap 1. The locking pin 5 is secured to the locking bar 2 approximately midway along the length of the locking bar 2 and projects from the convex side of the locking bar 2. The other end of the locking bar 2 has a hole 60 sized to loosely receive a threaded lower end 62 of a pull rod 6. The pull rod 6 is restricted from being pulled upward out of the locking bar hole 60 by a nut 63 disposed on the pull rod lower end 62. A compression spring 4 is positioned between the oven bottom 20 and the locking bar 2. One end of the compression spring 4 is seated over a first seating lug 50 projecting from the locking bar 2 and the other end of the compression spring 4 is seated over a second seating lug 52 projecting from the oven bottom 20.

A rod support 7 is attached to the oven shell 9 near the oven rim 10 and slidably supports the upper end of the pull rod 6. The rod support 7 is an L-shaped bracket having one leg secured to the oven shell 9 by suitable fastening means, such as screws, bolts or welds. The other leg of the rod support 7 has a hole 68 sized to loosely receive the upper end 64 of the pull rod 6. The pull rod upper end 6 terminates in a handle 66 which restricts the pull rod 6 from being pulled downwardly out of the pull rod hole 68.

A positive lock is achieved as the compression spring 4 forces the locking bar 2 against the locking strap 1, engaging the locking pin 5 into a hole 18 in the locking strap 1. In this configuration, the locking strap 1 and the locking bar 2 are disposed generally parallel to each other and define a plurality of discrete locking positions.

To adjust the inclination of the oven so that it is facing in the direction of the sun, pull rod 6 is pulled up, thereby disengaging locking pin 5 allowing the oven shell 9 to rotate freely on the pivot bolts 21a, 21b. The inclination of the oven shell 9 can then be readily adjusted. When the desired inclination is achieved, the oven shell 9 can then be locked into place by releasing pull rod 6, thereby engaging pin 5 into a hole 18 in the locking strap 1. A user can readily adjust the inclination of the oven shell 9 and rotate it simultaneously by grasping the oven rim 10 with one hand and operating the pull rod 6 with the other hand, while rotating the support means on the wheels 16a, 16b and the caster 17.

The embodiment shown in FIGS. 1–3 works best when used on a hard, generally flat surface. Referring to FIG. 4, for use on rough terrain, deep lawn or loose dirt the solar oven 99 can be placed on a relatively flat, rigid base 30 placed on the ground to provide a generally vertical plane on which to move and rotate the support means 200. In a preferred embodiment, the base 30 is made of plywood. A vertical pin 32 is inserted through the axle support member 15 approximately midway between the wheels 16a, 16b, pinning the support means 200 to the plywood. In this configuration, the oven shell 9 and support means 200 can be rotated about the axis of the vertical pin 32 for horizontal adjustment. Preferably the rigid base 30 is shaped to form a cover for the open end of the oven shell 9 so that it can be used as a protective cover for the oven shell when not being used as a base for the support means 200.

Referring to FIG. 5, an embodiment of my invention appropriate for use in a fixed location is shown. In this embodiment, the support assembly 200 includes a turntable 34 having a table top 36. Two vertical supports 38a, 38b are mounted to the table top. Each vertical support 38a, 39b has a pivot hole 8a, 8b therein for receiving the corresponding shell pivot bolt 21a, 21b. One end of the locking strap 1 is secured to the table top 36 by a screw, bolt, weld or other convenient means. The other end of the locking strap is secured to the upper portion of a rigid upright member 37 by such fastening means, with the lower portion of the upright member 37 being secured to the table top 36 by screws or other convenient fastening means. The oven shell 9 is pivotally mounted between the vertical supports 38a, 38b in the manner described above in this specification. The table top 36 is rotatably mounted on a pipe stand 40 buried in the ground and cut to convenient height. In this embodiment, the turntable 34 allows for horizontal adjustment of the oven shell 9 and also provides a convenient work surface.

Referring to FIG. 6, an alternative embodiment of my invention includes a fan 47 mounted on the oven frame 9. The fan 42 includes a fan blade 43 driven by an electric motor 44 that is powered by solar cell 46. The fan blade 43 is disposed inside the oven shell 9 near the oven bottom 20. By combining the principles of convection cooking (the moving of air within the oven chamber) with reflective cooking, this configuration reduces the unwanted hot spot at the center of focus, which would cause uneven browning or cooking of the food being prepared.

Although my invention has been described in considerable detail with reference to certain preferred embodiments, it will be apparent to those of ordinary skill in the art that various modifications and adaptations to those embodiments may be made without departing from the spirit and scope of the invention. For example, the oven frame may be of the type having a square shape, a round shape or any other appropriate shape. Moreover, the oven frame size may vary.

I claim:

1. Apparatus for supporting and adjusting the orientation of a solar oven with respect to the sun, said apparatus comprising:

a) a horizontally disposed main support frame;

b) a pair of vertically disposed and spaced apart support members and secured to said main support frame;

c) a solar oven disposed between said vertically disposed support members and pivotally mounted to said support members so that the inclination of said oven can be adjusted with respect to the sun;

d) means for locking said oven in a variety of positions with respect to the sun, said means including:

i) a rigid arcuate shaped locking strap positioned beneath said oven and secured to said main frame, the convex side of said strap positioned downwardly, said strap being provided with a series of spaced apart openings;

ii) a rigid arcuate shaped locking bar positioned immediately above said locking strap with one end of said locking bar hingedly secured to the bottom of said oven, with said locking bar provided with locking means which can engage with said opening in said locking strap; and iii) means for moving said locking bar toward or away from said locking strap whereby said locking means on said locking bar can be engaged or disengaged from said locking strap openings.

2. The apparatus of claim 1 wherein said locking bar is curved on an arc of a circle having a radius less than that of said locking strap.

3. The apparatus of claim 2 wherein the pivotal mounting of said oven to said vertically disposed support members is approximately midway between the top and bottom of said oven.

4. The apparatus of claim 3 wherein said means for moving said locking bar toward or away from said locking strap is a pull rod, one end of which is attached to the free end of said locking bar with the opposite end thereof slidably attached to said oven.

5. The apparatus of claim 4 wherein said engaging means of said locking bar is a locking pin positioned approximately midway of the length of said bar.

6. The apparatus of claim 5 wherein spring means are positioned between the bottom of said oven and said locking bar to force said locking bar against said locking strap whereby said locking pin may be engaged with an appropriate opening in said locking strap.

7. The apparatus of claim 6 wherein wheels are mounted to said main support frame.

8. The apparatus of claim 6 wherein said apparatus is mounted for rotation about a vertical axis.

9. The apparatus of claim 6 wherein said oven is provided with a fan to move air within said oven.

* * * * *